United States Patent
Abrecht et al.

(10) Patent No.: US 11,531,832 B2
(45) Date of Patent: Dec. 20, 2022

(54) METHOD FOR DETERMINING A CONFIDENCE VALUE OF AN OBJECT OF A CLASS

(71) Applicant: Robert Bosch GmbH, Stuttgart (DE)

(72) Inventors: Stephanie Abrecht, Stuttgart (DE); Oliver Willers, Korb (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 16/908,133

(22) Filed: Jun. 22, 2020

(65) Prior Publication Data

US 2020/0410282 A1    Dec. 31, 2020

(30) Foreign Application Priority Data

Jun. 27, 2019  (DE) .................. 102019209366.3
Jun. 28, 2019  (DE) .................. 102019209463.5

(51) Int. Cl.
*G06K 9/62*   (2022.01)
*G06N 3/04*   (2006.01)
(Continued)

(52) U.S. Cl.
CPC ........... *G06K 9/623* (2013.01); *G06K 9/6289* (2013.01); *G06N 3/0481* (2013.01); *G06N 3/08* (2013.01);
(Continued)

(58) Field of Classification Search
CPC .... G06K 9/623; G06K 9/6289; G06K 9/6256; G06K 9/6267; G06N 3/0481; G06N 3/08;
(Continued)

(56) References Cited

U.S. PATENT DOCUMENTS

| | | | |
|---|---|---|---|
| 2014/0185925 A1* | 7/2014 | Datta | G06K 9/6262 382/159 |
| 2017/0032247 A1* | 2/2017 | Tadesse | G06K 9/6265 |

(Continued)

FOREIGN PATENT DOCUMENTS

| | | | | |
|---|---|---|---|---|
| CA | 3072063 A1 * | 2/2019 | ......... | G06K 9/00335 |
| CN | 107871117 A * | 4/2018 | ......... | G06K 9/00362 |

(Continued)

OTHER PUBLICATIONS

Convolutional neural networks: an overview and application in radiology, Rikiya Yamashita et al., Springer, 2018, pp. 611-629 (Year: 2018).*

(Continued)

*Primary Examiner* — Jayesh A Patel
(74) *Attorney, Agent, or Firm* — Norton Rose Fulbright US LLP; Gerard Messina

(57) ABSTRACT

A method is described for determining a confidence value for an object of a class determined by a neural network in an input image. The method includes: preparing an activation signature with the aid of a multiplicity of output images of a layer of the neural network for the class of the object, with the input image being provided to the input of the neural network; scaling the activation signature to the size of the input image; comparing an overlapping area portion of an area of the activation signature with an area of an object frame in relation to the area of the activation signature in order to determine the confidence value.

11 Claims, 3 Drawing Sheets

(51) Int. Cl.
  *G06N 3/08* (2006.01)
  *G06V 10/75* (2022.01)
  *G06V 10/82* (2022.01)
  *G06V 10/774* (2022.01)
  *G06V 30/19* (2022.01)

(52) U.S. Cl.
  CPC ........ *G06V 10/7515* (2022.01); *G06V 10/774* (2022.01); *G06V 10/82* (2022.01); *G06V 30/19147* (2022.01)

(58) Field of Classification Search
  CPC ............. G06N 3/0454; G06V 10/7515; G06V 10/771; G06V 30/1912; G06V 10/803; G06V 30/1918; G06T 1/20
  See application file for complete search history.

(56) References Cited

U.S. PATENT DOCUMENTS

| | | | | |
|---|---|---|---|---|
| 2018/0350084 A1* | 12/2018 | Tamir | ................... | G06T 7/292 |
| 2019/0258878 A1* | 8/2019 | Koivisto | ............... | G06V 10/762 |
| 2019/0340779 A1* | 11/2019 | Finkelstein | .......... | G06N 3/0445 |
| 2020/0410297 A1* | 12/2020 | Willers | ................ | G06K 9/6281 |

FOREIGN PATENT DOCUMENTS

| | | | |
|---|---|---|---|
| CN | 108509954 A | * 9/2018 | |
| CN | 108875588 A | * 11/2018 | ......... G06K 9/00342 |

OTHER PUBLICATIONS

Score-CAM:Score-Weighted Visual Explanations for Convolutional Neural Networks, Haofan Wang et al., arXiv, 2020, pp. 1-11 (Year: 2020).*
Fused DNN: A deep neural network fusion approach to fast and robust pedestrian detection, Xianzhi Du et al., IEEE, 2017, pp. 953-961 (Year: 2017).*
Fused Deep Neural Networks for Efficient Pedestrian Detection, Xianzhi Du et al., arXiv, 2018, pp. 1-11 (Year: 2018).*
Multi-column Deep Neural Networks for Image Classification, Dan Ciresan et al., IEEE, 2012, pp. 3642-3649 (Year: 2012).*
Activity Recognition Using Temporal Optical Flow Convolutional Features and Multilayer LSTM, Amin Ullah et al., IEEE, 2018, pp. 9692-9702 (Year: 2018).*
Models for Pedestrian Trajectory Prediction and Navigation in Dynamic Environments, Jeremy Kerfs, Thesis May 2017, pp. 1-146 (Year: 2017).*
The Study of Activation Functions in Deep Learning for Pedestrian Detection and Tracking, M. N.Favorskaya et al., Remote Sensing and spatial information sciences, 2019, pp. 53-59 (Year: 2019).*

* cited by examiner

METHOD FOR DETERMINING A CONFIDENCE VALUE OF AN OBJECT OF A CLASS

CROSS REFERENCE

The present application claims the benefit under 35 U.S.C. § 119 of German Patent Application No. DE 102019209366.3 filed on Jun. 27, 2019, and German Patent Application No. DE 102019209463.5 filed on Jun. 28, 2019, which are both expressly incorporated herein by reference in their entireties.

FIELD

The present invention relates to a method for determining a confidence value for an object of a class determined by a neural network in an input image.

BACKGROUND INFORMATION

Deep learning methods are tested and further developed for the control of at least partially automated systems, e.g., self-driving vehicles or robots as examples of mobile platforms. An important component of such at least partially automated systems is their ability to perceive complex situations with regard to their environment. A prerequisite for the safe and effective operation of such an at least partially automated system is the interpretation of the environment and the assessment of the state of this environment, for example for decision processes such as trajectory planning and a trajectory control, for which the use of deep learning methods, i.e., the use of deep neural networks that are specifically trained, holds a great potential for solving such tasks.

SUMMARY

A basic problem with regard to the safety of such at least partially automated systems which use deep neutral networks, for example, is that the ability of the neural network to solve the specific task after the training could be assessed only if the input data in the application case were to come from the same distribution as the training dataset that was used to test and train the network. As a result, DNNs (deep neural network), which are used in object detection tasks, can only state what they have seen but not how certain they are in this regard.

However, for the object detection, for example, knowledge about the reliability of an object detection model is of the utmost importance for safe, at least partially automated driving.

At present, modern plausibility checks within the framework of the at least partially automated driving are normally limited to the comparison of a plurality of sensor systems or the analysis of the input data on the basis of expert knowledge, e.g., for the detection of difficult environmental conditions such as fog for optical sensors or a reduced data quality such as movement blurring in an individual image or an image sequence.

Thus, for example, anomalies in the determination of a representation of an environment and the objects or object segments determined therein in the application case are to be identified in a semantic segmentation with the aid of a dataset if the representation of the environment is performed using a deep neural network.

In accordance with the present invention, a method for determining a confidence value, a device as well as a computer program product and a computer-readable memory medium are provided, which at least partly have the mentioned effects. Advantageous embodiments of the present invention are described herein.

The present invention is based on the understanding that deviations in the determination of objects or object segments that are allocated to a class in the application case are able to be identified in that the detection patterns occurring during the determination should spatially occur at the location where an object was detected or where an object segment was classified.

A metric is provided by which possible deviations are able to be quantified in order to obtain a confidence value for the determination of an object by a neural network in the application case.

According to one aspect of the present invention, a method is provided for determining a confidence value for an object of a class determined by a neural network in an input image. In one step of the present method, an activation signature is prepared with the aid of a multiplicity of output images in a layer of the neural network for the class of the object, with the input image being provided to an input of the neural network. In a further step, the activation signature is scaled to a size of the input image. In a further step, an overlapping area portion of an area of the activation signature with an area of an object frame in relation to the area of the activation signature is compared in order to determine the confidence value.

A plausibility of the prediction of a trained deep neural network (DNN: deep neural network) in object detection tasks is thus able to be verified in that the activation signature for objects or object segments from the input images in the application case is compared to the area of an object frame or an object segment. An object frame may be a frame that completely encompasses a determined object, either in that the frame follows the outer form of the object or is rectangular, for example. This makes it possible to identify deviations between the training data and the input data during the application case.

In this context, the confidence value may indicate a dimension figure which quantifies anomalies in the determination and/or the classification of objects and thus supports the object detection with the aid a neural network by providing further information, in addition to the determination and/or the classification of an object, about a reliability of the object detection. Even if an object is correctly determined and/or was also correctly classified, such a confidence value is able to indicate the reliability of the used method.

A trained neural network is a neural network that was suitably trained for solving a specific task using new input data. A neural network provides a framework for many different algorithms such as for machine learning, for cooperation and for the processing of complex data inputs. Such neural networks learn to perform tasks on the basis of examples without typically having been programmed with task-specific rules.

Such a neural network is based on a collection of connected units or nodes, which are referred to as artificial neurons. Each connection is able to transmit a signal from one artificial neuron to another. An artificial neuron that receives a signal is able to process it and then activate further artificial neurons connected thereto.

In conventional implementations of neural networks, the signal at a connection of artificial neurons is a real number, and the output of an artificial neuron is calculated by a non-linear function of the sum of its inputs. The connections of the artificial neurons typically have a weight that adapts itself with further learning. The weight increases or decreases the strength of the signal at a connection. Artificial neurons may have a threshold so that a signal is output only if the total signal exceeds this threshold.

Typically, a multitude of artificial neurons is combined in layers. Different layers possibly perform different types of transformations for their inputs. Signals travel from the first layer, the input layer, to the last layer, the output layer, possibly after passing through the layers multiple times.

In addition to the developments of a neural network, the structure of an artificial convolutional neural network is made up of one or a plurality of convolutional layers, possibly followed by a pooling layer. The sequence of layers is able to be used with or without normalization layers (e.g., batch normalization), zero padding layers, dropout layers and activation functions, e.g., rectified linear unit ReLU, sigmoid function, tan h function or softmax function.

These units may basically repeat themselves as often as desired; given a sufficient number of repetitions, this is referred to as deep convolutional neural networks. Such a neural convolutional network may have a sequence of layers that sample the input grids down to a lower resolution in order to obtain the desired information and to store the redundant information.

If one describes the data of such a neural network by coordinate data and feature data, with the feature data being allocated to the coordinate data, the number of coordinate data typically becomes smaller in convolutional functions and the number of feature data that are allocated to the coordinate data increases. Typically, the feature data are combined into what is known as feature maps within the layers of the neural network.

The last convolutional layer extracts the most complex features that are disposed in a plurality of feature maps (feature maps having the values $A^k_{ij}$) and generate output images when input images are applied at the input of the neural network. In addition, the last convolutional layer retains spatial information that possibly gets lost in following, completely connected levels as the case may be, with the completely connected levels being used for the classification.

If an input image is applied at an input of such a neural network, then output images of the feature maps that are able to characterize certain features of the current input image result in the different layers and the corresponding feature maps. In neural convolutional networks, the number of feature maps is greatest in the last convolutional layer before the coordinate dimension becomes one-dimensional, for instance for the classification with the fully connected layers, so that the last convolutional layer of the neural network is preferably able to be selected for the preparation of the activation signature. In particular, the selection of the layer is free and able to be adapted to or optimized for special circumstances.

In the case of sequential convolutional layers, the feature map becomes increasingly smaller with regard to the size of the map in the sense of the number of pixels. For a comparison of an activation signature, which is prepared on the basis of such a smaller feature map of a convolutional layer, with an input image and the object of a class determined there, the activation signature is scaled to the size of the input image.

This example method is able to be used on any pretrained neural convolutional network without modifying or retraining it.

According to one aspect of the present invention, in the comparison of an overlapping area portion of the area of the activation signature with the area of the object frame in relation to the area of the activation signature, it is provided to take only the area portions of the activation signature into account in which the values of the activation signature are greater than a limit value. This makes it possible to vary the limit of what is to be considered an activation.

According to one aspect of the present invention, for the comparison of an overlapping area portion of an area of the activation signature with an area of an object frame in relation to the area of the activation signature, it is provided to set the sum of the pixels of the activation signature located within the object frame into relation to the sum of the pixels of the activation signature, with only the pixels being summed whose value of the activation signature is greater than a limit value.

This counting of pixels constitutes a very simple method for the afore-described determination, for which the limit value is able to be set as desired and thus may also be set to zero, for instance.

According to one aspect of the present invention, it is provided to set the sum of the pixels of the activation signature located within the object frame into relation to the sum of the pixels of the activation signature, as it is described by the correlation of formula 1:

$$AR = \frac{\sum_i p_{i,a>t \wedge p \in O}}{\sum_i p_{i,a>t}}$$

In this context, $\Sigma_i$ is a sum across summands indexed by i; $p_i$ is the pixel value indexed by i, and a represents the magnitude of the value of the activation signature that is greater than a limit value t. The mathematical AND sign links this with the demand that pixel p be an element of the object frame. For the object segment, a corresponding segment range is equivalent to the object frame.

According to one aspect of the present invention, it is provided that the object of a class also encompasses an object segment of a class of a semantic segmentation. This means that the neural network, whose output images of a layer are used to determine the activation signature, has to be provided not only for the determination and classification of objects in input images in order to apply the described method. The described method is also able to be used with neural networks that were structured and trained to perform a semantic segmentation. There, too, the segmentation according to certain classes produces differentiable area regions corresponding to objects that are classified. In such a segmentation, as well, it has to be expected that the activation signature spatially correlates with these area regions. As a result, the term "determination of objects" encompasses both the detection of objects and the semantic segmentation of object segments.

According to one aspect of the present invention, it is provided to determine the activation signature of the determined object of a class using the following steps. In one step of the present method, a relevance of each individual output image of the multiplicity of output images of the layer of the neural network is calculated for a classification of the determined object with the aid of a gradient method.

In a further step, each one of the output images is weighted by its respective relevance.

In a further step, the multiplicity of the weighted output images is combined.

In an additional step, an activation function is applied to the combined multiplicity of the weighted output images in order to amplify the features that have a positive influence on the classification in order to determine the activation signature.

By ascertaining the relevance of each individual output image, it is possible that in the later weighting, the output images of a layer that have the strongest influence on the categorization of this determined object are emphasized in the combination of the multiplicity of weighted output images. Thus, it is possible to image which regions within the object part have led to the corresponding categorization. If regions outside the object part were utilized for the categorization, then this constitutes an anomaly.

According to one aspect of the present invention, it is provided to carry out the calculation of the relevance of each individual output image for each pixel of each individual output image and to determine an average value across the relevance of the pixels of the output image. This leads to a single value for the relevance of an individual output image.

For instance, the combining of the multiplicity of the weighted output images is able to be implemented by a pixelwise addition of pixels whose positions correspond. In particular, the relevance of an individual output image for the classification of the determined object is able to be described by a single value in that the relevance, determined using the gradient method, is averaged across all pixels of the output image.

According to another aspect of the present invention, it is provided to determine the activation signature of the determined object of a class by the following steps. In one step, the relevance of each individual output image of the multiplicity of output images of a layer of the neural network is calculated for a classification of the determined object by determining a gradient of a class output value of the neural network in relation to the output images of the multiplicity of the output images.

In a further step, the gradient of the class output value is averaged across all pixels of the respective output image in order to determine a relevance of each individual output image of the multiplicity of output images of the layer of the neural network.

In a further step, each one of the output images is weighted by its respective relevance. In another step, all pixel values of the weighted output images that are situated in the weighted output images in positions that correspond to one another are summed; and in an additional step, the summed pixel values that have a positive influence on the classification are amplified by setting all negative values of the summed pixel values to zero in order to determine an activation signature.

Determining the relevance of an individual output image of a layer by a gradient method largely corresponds to the gradient-weighted class activation mapping (Grad-CAM) and is also able to be carried out using the Grad-CAM method. The Grad CAM is a technique for localizing and visualizing class-differentiating features in an input image, which makes the prediction about each convolutional neural network more transparent.

The determination of the relevance $\alpha_k^c$ of each individual output image of the multiplicity k of output images of the layer of the neural network is able to be calculated with the aid of formula 1:

$$\alpha_k^c = \frac{1}{Z} \Sigma_i \Sigma_j \frac{\partial y^c}{\partial A_{ij}^k};\qquad \text{formula 1}$$

In this context, index c represents the class of the determined object; i and j are the indexes of the pixels of the output image across which averaging with the double sum and the normalization factor Z takes place; and summed is the partial derivation of class output value $y^c$ according to output images $A_{ij}^k$.

In other words, in an input image and its class output value $y^c$ for class c, the gradients of the class output value (scores) are calculated with regard to the outputs of the feature maps, with the scores for all other classes being set to zero and averaged across the pixels on the respective feature maps in a global manner in order to obtain relevance $\alpha_k^c$ of each feature map for the object class.

The activation signature is able to be described by the following formula 2, $$L_{i,j}^c = \text{ReLU}(\Sigma_k A_{i,j}^k \alpha_k^c);\qquad \text{formula 2,}$$

with $L_{i,j}^c$ being the activation signature for class c having pixel indexes i, j.

In the process, summing is performed across a plurality k of output images $A_{i,j}^k$ with their pixel indexes i, j multiplied by relevance $\alpha_k^c$.

In other words, the output images (the output of the feature maps) are weighted with their respective relevance, combined, and followed by a rectified linear unit (ReLU) for the intensification of features that have a positive influence on the class determination. The result is a coarse activation signature (heatmap), to which the input image is able to be superposed in order to highlight important image parts.

According to a further aspect of the present invention, it is provided to set the output values of the remaining classes to zero for the calculation of the relevance of each individual output image. As a result, only the relevance of this class is assessed in the calculation.

According to one aspect of the present invention, it is provided to generate a signal if the confidence value is lower than a threshold value for the confidence value, with the threshold value having been ascertained with the aid of training data or test data. For example, the use of such a threshold value allows an alarm signal to be realized as a function of the current situation and the current confidence value.

A threshold is able to be established based on the confidence values that were ascertained in training and test datasets.

If the confidence value lies below a threshold value for new observations, then this may point to an anomaly. A low confidence value indicates that the system becomes involved in a situation for which it has not been trained.

In addition, the described method is also able to be used as a development tool, for instance in order to identify implausible results for further analyses already while training a neural network.

According to one aspect of the present invention, it is provided to make the confidence value available as a weighting factor for a situation-analysis method. Thus, a parameter is available to the situation-analysis method by the confidence value by which results of the determination and/or the classification of objects with the aid of the neural network are able to be evaluated and compared with other information about the environment with the aid of further sensors.

For example, an object determined with the aid of the neural network in which the determination is linked with a high confidence value is able to be weighted more heavily in comparison with other sensor data than with low confidence values.

According to one aspect of the present invention, it is provided that an actuation signal for the actuation of an at least partially automated vehicle and/or a warning signal for warning a vehicle occupant is/are emitted as a function of the magnitude of the confidence value. A corresponding example regarding an object correctly classified as a pedestrian, but in which the position of the pedestrian has a low confidence value, has already been described in the previous text.

In accordance with an example embodiment of the present invention, a device is provided, which is configured to carry out a method as described above. With the aid of such a device, the present method is easily able to be integrated into different systems.

In accordance with an example embodiment of the present invention, a computer program is provided, which includes instructions that in an execution of the computer program by a computer, induce it to carry out one of the afore-described methods. Such a computer program allows the described method to be used in different systems.

In accordance with an example embodiment of the present invention, a machine-readable memory medium is provided on which the afore-described computer program is stored.

BRIEF DESCRIPTION OF THE DRAWINGS

Exemplary embodiments of the present invention are shown in FIGS. 1 through 3 and are described in greater detail below.

DETAILED DESCRIPTION OF EXAMPLE EMBODIMENTS

Figure 1:
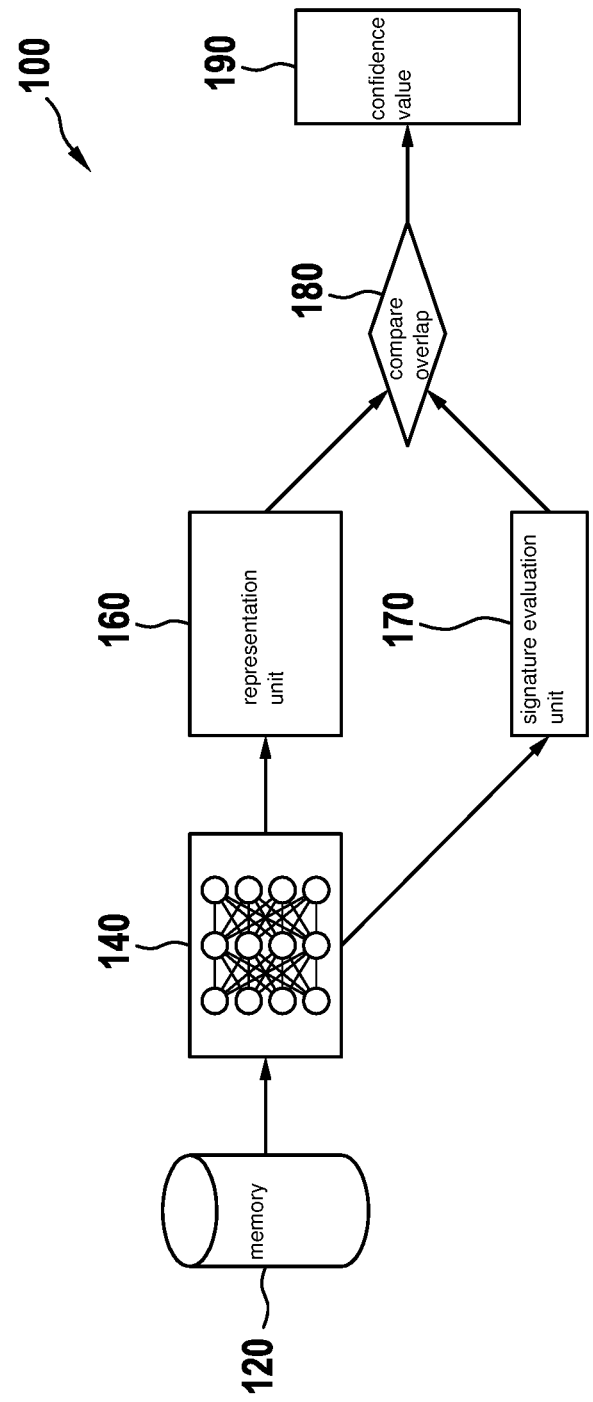
FIG. 1 shows a flow diagram of the data streams of the present method.

FIG. 1 sketches a data flow between components for the purpose of determining a confidence value 190. In data flow diagram 100, the data, e.g., of sensors, from different sources are provided to trained neural network 140 in the application case by a memory 120 or directly from the sensors in the form of input images. In this application case, neural network 140 determines and categorizes objects that are included in the input images and conveys these results to a representation unit 160, which supplies its results, e.g., detected objects or segmented sub-regions of the input image, to comparison unit 180.

Neural network 140 is trained to determine and classify objects. Alternatively, neural network 140 may be configured and trained to semantically segment its input images into object segments. In the process, neural network 140 generates a multiplicity of output images of a layer for the class of the determined objects and conveys these output images to a signature evaluation unit 170. Signature evaluation unit 170 prepares an activation signature with the aid of the multiplicity of output images of neural network 140 and scales the activation signature to the size of the input image. Signature evaluation unit 170 conveys the scaled activation signature to comparison unit 180.

Comparison unit 180 compares the overlap between the activation signature and the object frame in order to determine confidence value 190.

Figure 2:
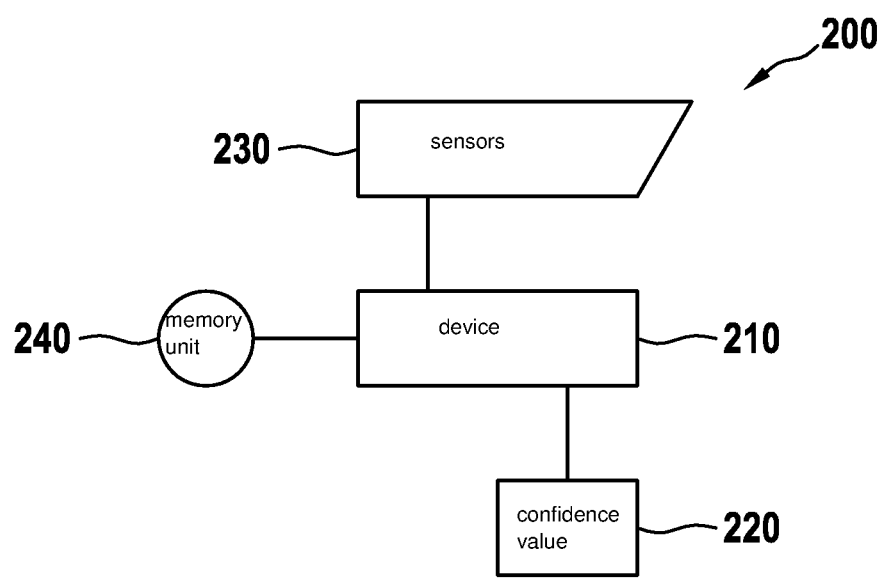
FIG. 2 shows an example system having a device which is configured to determine a confidence value in accordance with the present invention.

FIG. 2 sketches a system 200 having a device 210 which is configured to carry out the method for determining a confidence value in the application case. Sensors 230 provide input images to device 210 directly or via a memory unit 240, so that device 210 is able to supply a confidence value 220 using the afore-described method.

Figure 3:
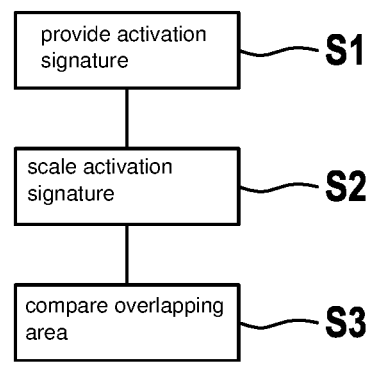
FIG. 3 shows the steps of an example method for determining the confidence value in accordance with the present invention.

FIG. 3 sketches the example method for determining a confidence value for an object of an (object) class determined by a neural network in an input image, in which, in a step S1, an activation signature is provided with the aid of a multiplicity of output images of a layer of the neural network for the class of the determined object.

In a further step S2, the activation signature is scaled to the size of the input image.

In an additional step S3, an overlapping area portion of an area of the activation signature with an area of an object frame in relation to the area of the activation signature is compared in order to determine the confidence value.

What is claimed is:

1. A method for determining a confidence value for an object of a class determined by a neural network in an input image, the method comprising the following steps:
   preparing an activation signature using a multiplicity of output images of a layer of the neural network for the class of the object, with the input image being provided to an input of the neural network;
   scaling the activation signature to a size of the input image; and
   comparing an overlapping area portion of an area of the activation signature with an area of an object frame in relation to the area of the activation signature to determine the confidence value.

2. The method as recited in claim 1, wherein in the comparison of the overlapping area portion of the area of the activation signature with the area of the object frame in relation to the area of the activation signature, only area portions of the activation signature are taken into account in which values of the activation signature are greater than a limit value.

3. The method as recited in claim 1, wherein for the comparison of the overlapping area portion of the area of the activation signature with the area of then object frame in relation to the area of the activation signature, a sum of pixels of the activation signature that located within the object frame are set into relation to a sum of the pixels of the activation signature, with only those pixels being summed whose value of the activation signature is greater than a limit value.

4. The method as recited in claim 1, wherein the object also encompasses an object segment of a semantic segmentation.

5. The method as recited in claim 1, wherein the activation signature of the determined object of a class is determined using the following steps:
   calculating a respective relevance of each individual output image of the multiplicity of output images of the layer of the neural network for a classification of the determined object using a gradient method;
   weighting each one of the output images with its respective relevance;
   combining the multiplicity of the weighted output images;

applying an activation function to the combined multiplicity of weighted output images to amplify features that have a positive influence on the classification in order to determine the activation signature.

6. The method as recited in claim 1, wherein the activation signature of the determined object of a class is determined using the following steps:
calculating a respective relevance of each individual output image of the multiplicity of output images of a layer of the neural network for a classification of the determined object by determining a gradient of a class output value of the neural network in relation to the output images of the multiplicity of output images;
averaging gradients of the class output value across all pixels of the respective output image to determine a respective relevance of each individual output image of the multiplicity of output images of the layer of the neural network;
weighting each one of the output images with its respective relevance;
summing all pixel values of the weighted output images that are situated in the weighted output images in positions that correspond to one another; and
amplifying the summed pixel values that have a positive influence on the classification by setting all negative values of the summed pixel values to zero to determine an activation signature.

7. The method as recited in claim 1, wherein a signal is generated when the confidence value is lower than a threshold value for the confidence value, the threshold value having been ascertained using training data or test data.

8. The method as recited in claim 1, wherein the confidence value is made available as a weighting factor for a situation-analysis method.

9. The method as recited in claim 1, wherein an actuation signal for an actuation of an at least partially automated vehicle and/or a warning signal for warning a vehicle occupant is emitted as a function of a magnitude of the confidence value.

10. A device configured to determine a confidence value for an object of a class determined by a neural network in an input image, the device comprising:
a processor, wherein the processor is programmed to:
prepare an activation signature using a multiplicity of output images of a layer of the neural network for the class of the object, with the input image being provided to an input of the neural network;
scale the activation signature to a size of the input image; and
compare an overlapping area portion of an area of the activation signature with an area of an object frame in relation to the area of the activation signature to determine the confidence value.

11. A non-transitory machine-readable memory medium on which is stored a computer program for determining a confidence value for an object of a class determined by a neural network in an input image, the computer program, when executed by a computer, causing the computer to perform the following steps:
preparing an activation signature using a multiplicity of output images of a layer of the neural network for the class of the object, with the input image being provided to an input of the neural network;
scaling the activation signature to a size of the input image; and
comparing an overlapping area portion of an area of the activation signature with an area of an object frame in relation to the area of the activation signature to determine the confidence value.

\* \* \* \* \*